United States Patent
Cooper et al.

(10) Patent No.: US 12,154,592 B2
(45) Date of Patent: Nov. 26, 2024

(54) AUTOMATED SYSTEM AND METHOD FOR DIAGNOSING TAPE DRIVE AND MEDIA ISSUES WITHIN LARGE-SCALE TAPE LIBRARY SYSTEM

(71) Applicant: Quantum Corporation, San Jose, CA (US)

(72) Inventors: Steve Cooper, Costa Mesa, CA (US); Robert Yang, Greenwood Village, CO (US)

(73) Assignee: Quantum Corporation, Centennial, CO (US)

( * ) Notice: Subject to any disclaimer, the term of this patent is extended or adjusted under 35 U.S.C. 154(b) by 0 days.

(21) Appl. No.: 17/978,889

(22) Filed: Nov. 1, 2022

(65) Prior Publication Data

US 2023/0136224 A1 May 4, 2023

Related U.S. Application Data

(60) Provisional application No. 63/274,794, filed on Nov. 2, 2021.

(51) Int. Cl.
*G11B 15/68* (2006.01)
*G11B 15/18* (2006.01)

(52) U.S. Cl.
CPC ...... *G11B 15/6835* (2013.01); *G11B 15/1825* (2013.01)

(58) Field of Classification Search
None
See application file for complete search history.

(56) References Cited

U.S. PATENT DOCUMENTS

| | | | | |
|---|---|---|---|---|
| 7,116,506 | B1 * | 10/2006 | Mojica | G11B 15/6835 360/71 |
| 10,514,992 | B1 * | 12/2019 | Tolstoy | G06F 3/0631 |
| 10,860,428 | B2 * | 12/2020 | Adrian | G06F 11/1456 |

(Continued)

OTHER PUBLICATIONS

Laskaridis, Stefanos et al. "Tape SCSI monitoring and encryption at CERN", J. Phys.: Conf. Ser. 898 Jun. 2005.

(Continued)

*Primary Examiner* — Fred Tzeng
(74) *Attorney, Agent, or Firm* — Wolf, Greenfield & Sacks, P.C.

(57) ABSTRACT

A tape library system includes a plurality of tape libraries, a plurality of data centers, and an error diagnostic system. Each of the plurality of tape libraries includes a tape drive, at least one tape cartridge that retains magnetic tape, and a tape cartridge mover that moves the tape cartridge relative to the tape drive. Each of the plurality of data centers is configured to retain at least one of the plurality of tape libraries. The error diagnostic system includes (i) a central database that is configured to receive one or more error codes from each of the plurality of tape libraries, each of the one or more error codes being generated due to errors that occurred during operation of the tape drive within a corresponding tape library, and (ii) a system controller including a processor that is configured to analyze the one or more error codes from each of the plurality of tape libraries to determine a health of the tape drive and the at least one tape cartridge within the corresponding tape library.

20 Claims, 4 Drawing Sheets

(56) References Cited

U.S. PATENT DOCUMENTS

| | | | | |
|---|---|---|---|---|
| 11,341,994 | B1* | 5/2022 | Goker | G11B 5/40 |
| 11,593,204 | B2* | 2/2023 | Lamberts | G06F 11/3476 |
| 2006/0126211 | A1* | 6/2006 | Sasaki | G11B 15/07 |
| 2007/0025008 | A1* | 2/2007 | Ballard | G11B 27/36 |
| 2008/0198489 | A1* | 8/2008 | Ballard | G11B 27/36 |
| | | | | 360/31 |
| 2010/0007978 | A1* | 1/2010 | Fry | G11B 20/1816 |
| | | | | 360/31 |
| 2010/0157766 | A1* | 6/2010 | Gregg | G11B 27/36 |
| 2010/0182887 | A1* | 7/2010 | Moody, II | G11B 19/048 |
| 2010/0265807 | A1* | 10/2010 | Thompson | G11B 20/1803 |
| | | | | 369/53.41 |
| 2010/0302667 | A1* | 12/2010 | Fry | G11B 20/1816 |
| 2010/0321811 | A1* | 12/2010 | Goberis | G11B 27/36 |
| | | | | 360/92.1 |
| 2011/0145497 | A1* | 6/2011 | Bish | G06F 11/1464 |
| | | | | 711/111 |
| 2011/0211273 | A1* | 9/2011 | Thompson | G11B 20/1803 |
| 2013/0031427 | A1* | 1/2013 | Itagaki | G11B 20/1816 |
| | | | | 714/54 |
| 2013/0083638 | A1* | 4/2013 | Edling | G11B 15/689 |
| 2014/0112118 | A1* | 4/2014 | Moody, II | G06F 3/0604 |
| | | | | 369/53.42 |
| 2014/0365610 | A1* | 12/2014 | Kumar | H04L 67/10 |
| | | | | 709/218 |
| 2015/0117174 | A1* | 4/2015 | Alber | G11B 17/00 |
| | | | | 369/53.41 |
| 2015/0155004 | A1* | 6/2015 | Itagaki | G06F 11/079 |
| | | | | 360/31 |
| 2015/0243323 | A1* | 8/2015 | Moody, II | G11B 27/34 |
| | | | | 369/53.42 |
| 2022/0197515 | A1* | 6/2022 | Peng | G11B 5/455 |
| 2023/0005501 | A1* | 1/2023 | Wyman | G06F 3/0686 |
| 2023/0005511 | A1* | 1/2023 | Jhatakia | G06F 3/0617 |

OTHER PUBLICATIONS

Klein, Andy, "Using Machine Learning to Predict Hard Drive Failures", Backblaze.com/blog/author/andy, Oct. 12, 2021.

Lu, Sidi, et al. "Making Disk Failure Predictions SMARTer!" 18th USENIX Conference on File and Storage Technologies, 2020.

* cited by examiner

AUTOMATED SYSTEM AND METHOD FOR DIAGNOSING TAPE DRIVE AND MEDIA ISSUES WITHIN LARGE-SCALE TAPE LIBRARY SYSTEM

RELATED APPLICATION

This application claims priority on U.S. Provisional Application Ser. No. 63/274,794 filed on Nov. 2, 2021 and entitled "ADVANCED DRIVE DIAGNOSTICS FOR USE WITH TAPE LIBRARIES AND TAPE CARTRIDGE CAPACITY REPORTING DURING STREAMING WRITE". As far as permitted, the contents of U.S. Provisional Application Ser. No. 63/274,974 are incorporated in their entirety herein by reference.

BACKGROUND

Automated tape library systems (also sometimes referred to herein as "tape library systems", "library systems" or "tape systems"), which can include one or more automated tape libraries (also sometimes referred to herein as "tape libraries"), are commonly utilized for purposes of writing data to and reading data from magnetic tape cartridges (also sometimes referred to herein as "tape cartridges" or more generally as "storage media"). In particular, the tape libraries typically include a robotic, tape cartridge mover that selectively retrieves and/or moves tape cartridges as desired between storage slots and tape drives within the tape library. More specifically, upon receiving a signal to access a certain tape cartridge, such as from a user, customer or host application (or simply a "host"), the tape cartridge mover can be manipulated to physically retrieve the requested tape cartridge from its associated storage slot in the tape library. Subsequently, the tape cartridge mover moves the tape cartridge to an appropriate tape drive, and inserts the tape cartridge into a drive housing of the tape drive so that requested read/write operations can be performed on the magnetic tape retained within the tape cartridge. Upon completion of the requested read/write operations, the tape cartridge mover can then return the tape cartridge to an appropriate storage slot.

The design of tape libraries has been altered substantially in recent years so that the tape libraries exhibit drastic increases in storage capacity. However, such increases in storage capacity come with lot of novel techniques that need to be implemented either mechanically or electronically into the tape library. The number of components that collaboratively work together to enable such increases in storage capacity also poses the challenge of failure rates and potential catastrophic propagation of errors. Unfortunately, failures can be abundant within tape libraries. For example, failures can occur in the tape drives, the storage media (tape cartridges), and/or the tape cartridge mover. In fact, tape libraries are subject to various types of errors including damage to the storage media, malfunction of the tape cartridge mover, clogging of the tape head(s) in the tape drives, other tape drive hardware issues, debris accumulation, etc. Depending on when such errors first arose in the overall time course of events, there can be a complex connection between the constituent components and these failure types.

Tracking the root cause of these failures can be extremely hard, but is an important step towards designing more robust library systems. The tape library components are to blame when hard (persistent) errors occur during the lifetime of tape libraries. Due to its assembled and mechanical nature, tape cartridge movers (and other mechanical components for the same matter), tape cartridges and tape drives, with all supporting electronics, interact in an exclusive way. A specific hard/persistent error in one or more components of the tape system might begin affecting the other components severely, eventually leading other components to fail or malfunction down the road. Also, with removable media systems such as tape drives and tape cartridges, errors can be correlated rather than random leading to difficulties in isolating failures to individual tape drives or storage media. This issue can be amplified even more with hyperscale applications where drive and media numbers are scaled to very large quantities. However, detection and replacement of a component in a large and complex library system could be priceless as it can stop failures from accumulating and propagating in an undesired manner, thus saving money that the owners may otherwise have to spend down the road.

In many situations, understanding tape drive and storage media problems in individual tape libraries can be relatively simple. For example, SCSI-based data logging has been a mainstream data analytic input process for managing tape and cartridge problems in order to manage archival data based on magnetic tape systems, especially linear tape open (LTO) based systems. However, such analysis can quickly become unreasonably labor intensive and time-consuming when there are multiple customers (or hosts) and multiple tape libraries (up to hundreds or even thousands of tape libraries) in multiple data centers. This can dramatically alter the total cost of ownership (TCO) in a negative way for the customers. Accordingly, it is desired to develop a more scalable solution that can determine in an automated manner when tape drives and/or storage media should be replaced, and/or when the failures can be compensated for in another suitable manner, such as cleaning the tape heads of the tape drives, so no components need to be replaced.

SUMMARY

The present invention is directed toward a tape library system including a plurality of tape libraries, a plurality of data centers, and an error diagnostic system. Each of the plurality of tape libraries includes a tape drive, at least one tape cartridge that retains magnetic tape, and a tape cartridge mover that moves the tape cartridge relative to the tape drive. Each of the plurality of data centers is configured to retain at least one of the plurality of tape libraries. In various embodiments, the error diagnostic system includes (i) a central database that is configured to receive one or more error codes from each of the plurality of tape libraries, each of the one or more error codes being generated due to errors that occurred during operation of the tape drive within a corresponding tape library, and (ii) a system controller including a processor that is configured to analyze the one or more error codes from each of the plurality of tape libraries to determine a health of the tape drive and the at least one tape cartridge within the corresponding tape library.

In some embodiments, the processor is configured to analyze the one or more error codes from each of the plurality of tape libraries to determine one of (i) the tape drive within the corresponding tape library needs to be replaced, (ii) a tape cartridge of the at least one tape cartridge within the corresponding tape library needs to be replaced, and (iii) the corresponding tape library can continue operation without replacement of the tape drive and without replacement of any of the at least one tape cartridge within the corresponding tape library.

In certain embodiments, the processor is configured to analyze the one or more error codes from each of the plurality of tape libraries to determine if the tape drive needs to be cleaned within the corresponding tape library.

In various embodiments, a host application requests that a read/write operation be performed in one of the tape libraries with respect to the at least one tape cartridge utilizing the tape drive of the corresponding tape library.

In some embodiments, one of the tape drive and the corresponding tape library generates the one or more error codes based on an error that occurs during the requested read/write operation, and transmits the one or more error codes to the error diagnostic system.

In certain embodiments, the processor of the error diagnostic system analyzes the one or more error codes and generates a recommended remedial action based on the analysis of the one or more error codes.

In some embodiments, the error diagnostic system transmits the recommended remedial action to the host application.

In certain embodiments, at least two of the plurality of data centers are positioned in different geographical locations.

In one embodiment, each of the plurality of data centers is positioned in a different geographical location.

The present invention is further directed toward a method of diagnosing health of components within a tape library system, the method including the steps of (A) establishing architecture of the tape library system including (i) a plurality of tape libraries, each of the plurality of tape libraries including a tape drive, at least one tape cartridge that retains magnetic tape, and a tape cartridge mover that moves the tape cartridge relative to the tape drive; and (ii) a plurality of data centers, each of the plurality of data centers being configured to retain at least one of the plurality of tape libraries; (B) receiving one or more error codes from each of the plurality of tape libraries within a central database of an error diagnostic system, each of the one or more error codes being generated due to errors that occurred during operation of the tape drive within a corresponding tape library, the error diagnostic system further including a system controller including a processor; and (C) analyzing the one or more error codes from each of the plurality of tape libraries with the processor to determine a health of the tape drive and the at least one tape cartridge within the corresponding tape library.

The present invention is also directed toward a tape library system including a plurality of tape libraries, each of the plurality of tape libraries including a tape drive, at least one tape cartridge that retains magnetic tape, and a tape cartridge mover that moves the tape cartridge relative to the tape drive; a plurality of data centers, each of the plurality of data centers being configured to retain at least one of the plurality of tape libraries, at least two of the plurality of data centers being positioned in different geographical locations; and an error diagnostic system including a central database and a system controller including a processor; wherein a host application requests that a read/write operation be performed in one of the tape libraries with respect to the at least one tape cartridge utilizing the tape drive of the corresponding tape library; wherein one of the tape drive and the corresponding tape library generates one or more error codes based on errors that occur during the requested read/write operation within the corresponding tape library, and transmits the one or more error codes to the error diagnostic system; wherein the central database receives one or more error codes from each of the plurality of tape libraries; wherein the processor of the error diagnostic system analyzes the one or more error codes and generates a recommended remedial action based on the analysis of the one or more error code, the recommended remedial action including one of (i) the tape drive within the corresponding tape library needs to be replaced, (ii) a tape cartridge of the at least one tape cartridge within the corresponding tape library needs to be replaced, and (iii) the corresponding tape library can continue operation without replacement of the tape drive and without replacement of any of the at least one tape cartridge within the corresponding tape library; and wherein the error diagnostic system transmits the recommended remedial action to the host application.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

Figure 1:
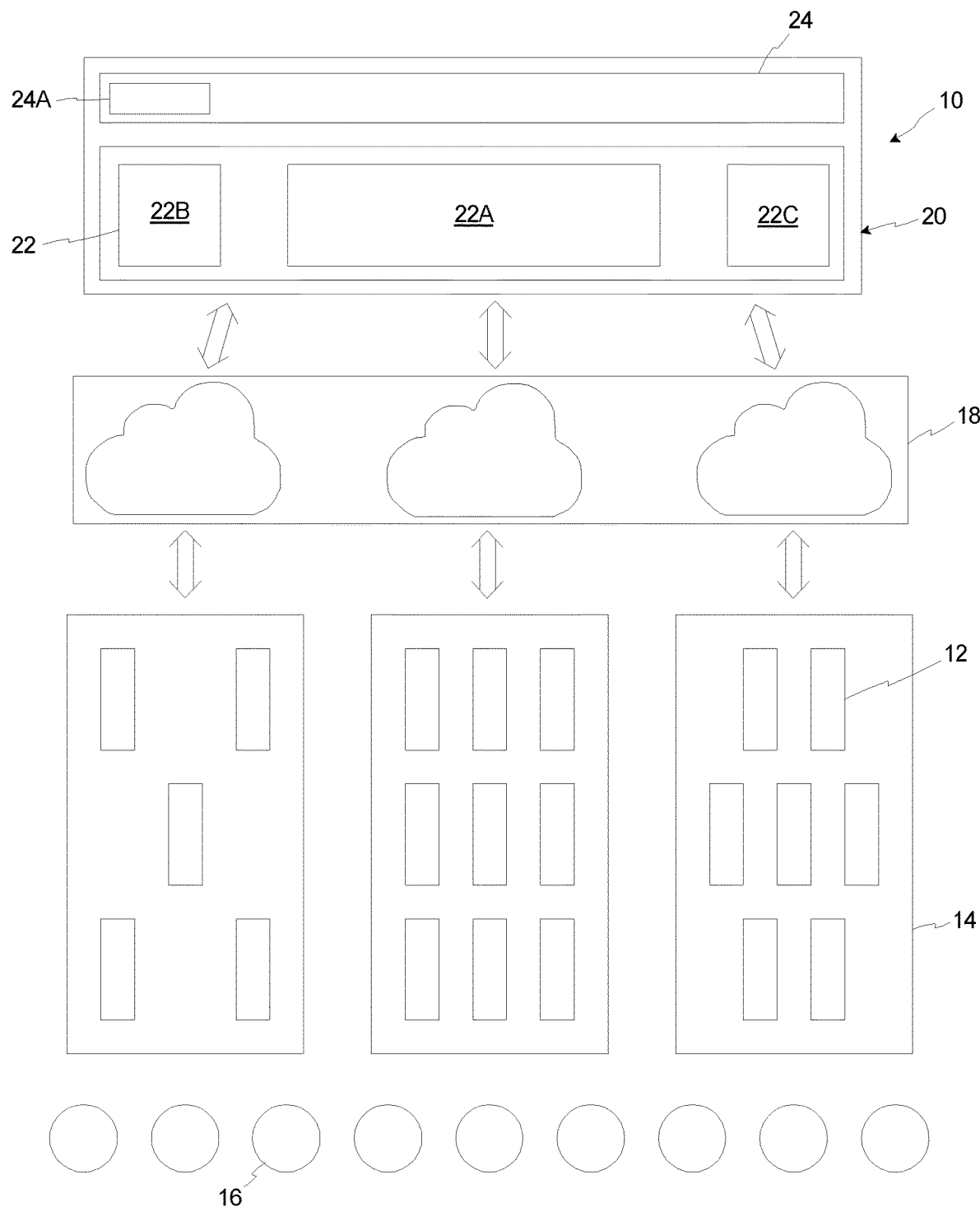
FIG. 1 is a simplified schematic illustration of an embodiment of a tape library system having features of the present invention.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of an automated system and method for diagnosing tape drive and media issues within large-scale tape library systems. More specifically, the present invention provides an automated error diagnostic system and method for receiving and analyzing error codes from a plurality of tape libraries that are located within a plurality of data centers, which can be at different geographical locations, to determine whether the errors are a result of (i) problems with the storage media (which may warrant replacement of the storage media), (ii) problems with the tape drives (which may warrant replacement of the tape drives), or (iii) other problems that can be resolved without the need for replacement of any storage media or tape drives. As such, the present invention provides a scalable solution for diagnosing health of the tape drives and tape cartridges within a tape library system that improves on previous methodologies that do not work at scale.

Those of ordinary skill in the art will realize that the following detailed description of the present invention is illustrative only and is not intended to be in any way limiting. Other embodiments of the present invention will readily suggest themselves to such skilled persons having the benefit of this disclosure. The following detailed description is, therefore, not to be taken in a limiting sense, and the scope of the present invention is defined only by the appended claims. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 is a simplified schematic illustration of an embodiment of a tape library system 10 having features of the present invention. As illustrated, the tape library system 10 of the present invention can be a large-scale, or hyperscale, tape library system. The design of the tape library system 10 can be varied. In the embodiment illustrated in FIG. 1, the tape library system 10 includes a plurality of tape libraries 12, a plurality of data centers 14, one or more users, consumers or host applications 16 (or simply "hosts") that access the plurality of tape libraries 12 and/or the plurality of data centers 14, a data transmission system 18, and an error diagnostic system 20. Additionally, as shown, the error diagnostic system 20 can include a central database 22, and a system controller 24, including a processor 24A, which is configured to control operation of the error diagnostic system 20 for purposes of diagnosing tape drive and storage media issues within the tape library system 10. Alternatively, the tape library system 10 can include more components or fewer components than those specifically illustrated and described in relation to FIG. 1.

It is appreciated that, although the present invention is generally described as being usable within a tape library system including a plurality of tape libraries in a plurality of data centers, the teaching provided herein is in no way restrictive to tape libraries in particular. More specifically, any system with multiple and interactive components could fall into the described system, model or scheme. For example, the present invention can also be applicable to DNA storage where DNA storage systems use vessels to hold data synthesized using DNA technology, and there are many vessels including synthesizer (writer) or sequencing (reading) equipment, which can be equated with tape drives writing and reading magnetic recording data, with both using robotics-based libraries.

The plurality of tape libraries 12 are configured for purposes of storing tape cartridges 226 (illustrated in FIG. 2), and for utilizing tape drives 228 (illustrated in FIG. 2) for writing data to and/or reading data from the tape cartridges 226.

Unfortunately, various types of errors can potentially occur during use of the tape libraries 12, such as during the processes of utilizing the tape drives 228 for writing data to and/or reading data from the tape cartridges 226. Through use of the present invention, when any such errors occur, error codes are generated within the tape drives 228 and/or the tape libraries 12, which are subsequently transmitted to the error diagnostic system 20 via the data transmission system 18. In order to inhibit any singular errors from propagating to cause additional errors within the tape library system 10, it is desired to diagnose any potential issues with the tape drives 228 and/or the tape cartridges 226 that can be derived from such errors and/or error codes through use of the error diagnostic system 20. In particular, the error diagnostic system 20 can analyze the realized errors and/or error codes to determine a health of the tape drives 228 and/or the tape cartridges 226. More specifically, the error diagnostic system 20 can analyze the realized errors and/or error codes (or "error code data"), such as by comparing the realized errors and/or error codes with error codes previously realized and captured within the error diagnostic system 20, to determine one of (i) a tape drive 228 being used within one of the plurality of tape libraries 12 needs to be replaced, (ii) a tape cartridge 226 being used within one of the plurality tape libraries 12 needs to be replaced, and (iii) the plurality of tape libraries 12 can continue operation without replacement of the tape drives 228 and without replacement of the tape cartridges 226 within the tape library 12. As such, the error diagnostic system 20 can provided an automated system and method by which the health of the tape drives 228 and/or tape cartridges 226 can be effectively and accurately diagnosed. Moreover, by continuing to gather, store and process additional error codes from any tape libraries 12 and/or data centers 14 within the tape library system 10, the error diagnostic system 20 can continually create a more robust system through feedback as to whether or not the recommended health diagnosis effectively inhibited any potential error repetition or propagation within the tape library system 10.

It is further noted that when diagnosing the health of the tape drives 228 and/or tape cartridges 226 within any tape libraries 12 and/or data centers 14 within the tape library system 10, the error code(s) received within the error diagnostic system 20 can be analyzed individually and/or in combination with any other error code(s) that are related to the same tape drive 228 and/or tape cartridge 226.

The tape library system 10 can include any suitable number of tape libraries 12 and any suitable number of data centers 14. As illustrated, each of the plurality of data centers 14 is configured to retain at least one of the plurality of tape libraries 12. For purposes of simplicity, the tape library system 10 is illustrated with only three data centers 14, with a first data center 14 including five tape libraries 12, a second data center 14 including seven tape libraries 12, and a third data center 14 including nine tape libraries 12. However, it is appreciated that in many large-scale, or hyperscale, tape library systems, the tape library system 10 may include tens or hundreds of data centers 14, and hundreds or thousands of tape libraries 12.

The data centers 14 can have any suitable design for purposes of providing a desired housing for the plurality of tape libraries 12. In certain embodiments, the plurality of data centers 14 can be individual buildings, rooms within buildings, or other portions of buildings, which can each provide the desired housing for at least one of the plurality of tape libraries 12. Alternatively, the data centers 14 can have another suitable design.

In some embodiments, at least two of the plurality of data centers 14 are positioned in different geographical locations. In other embodiments, each of the plurality of data centers 14 can be positioned in different geographical locations.

Figure 2:
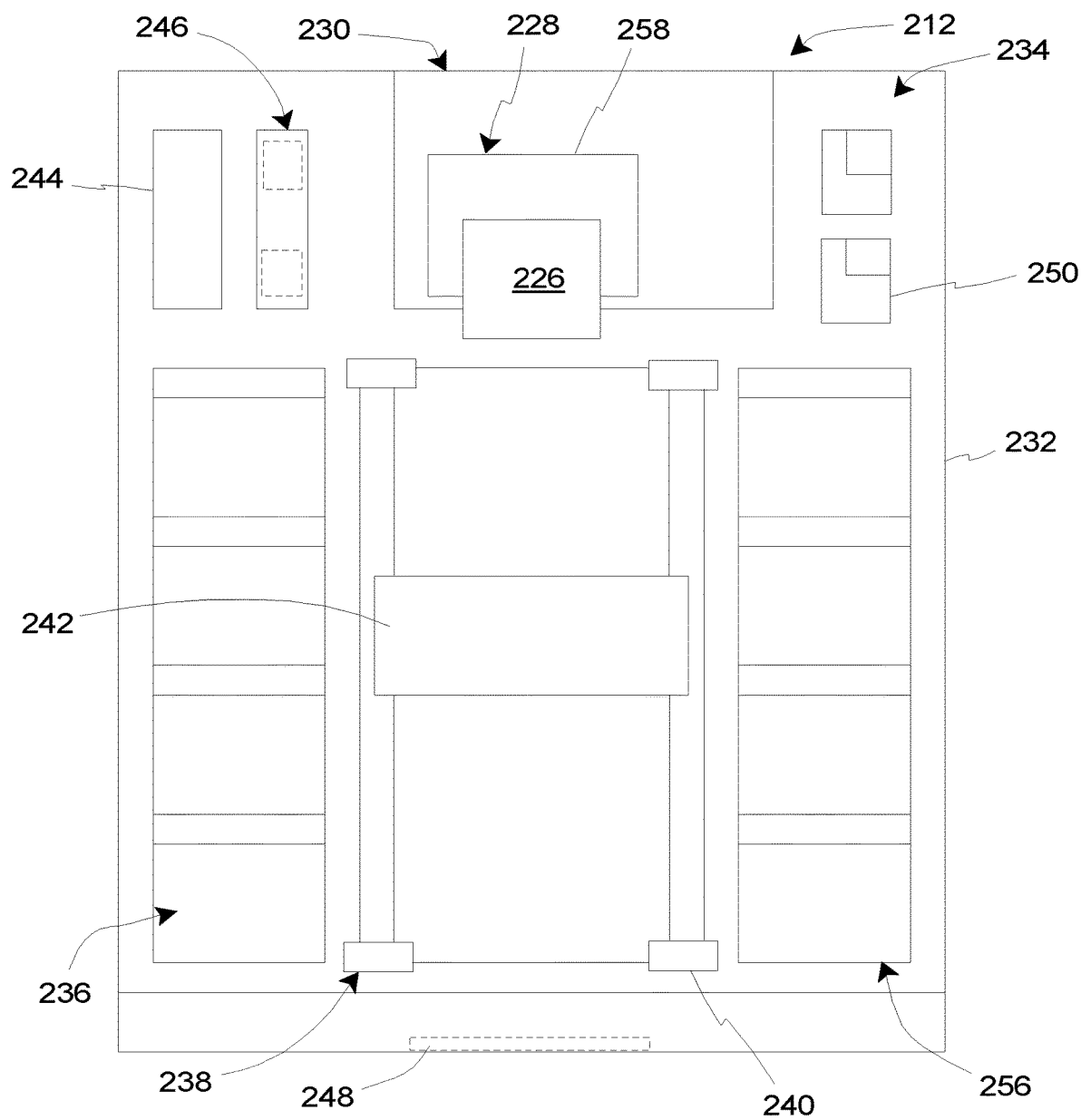
FIG. 2 is a simplified schematic top view illustration of an embodiment of an automated tape library that can be incorporated into the tape library system illustrated in FIG. 1.

Referring now to FIG. 2, FIG. 2 is a simplified schematic top view illustration of an automated tape library 212 (also sometimes referred to herein simply as a "tape library") that can be incorporated into the tape library system 10 illustrated in FIG. 1. It is appreciated, however, that the tape library 212 illustrated and described herein is just one simple example of a tape library 212 usable as part of the tape library system 10. Moreover, any of the plurality of tape libraries 12 included within the tape library system 10 can have designs that are different from one another, or can have designs that are substantially similar to one another.

The tape library 212 includes a tape drive system 230 that includes one or more tape drives 228 that are usable for writing data to and reading data from magnetic tape 331 (illustrated in FIG. 3, and sometimes referred to as "tape medium") that is retained within a tape cartridge 226. In FIG. 2, a top cover (not shown) has been omitted for clarity so that the interior of the tape library 212 is visible. The design of the tape library 212 can be varied as desired. In particular, the tape library 212 can have any suitable design that is capable of storing a plurality of tape cartridges 226 and using one or more tape drives 228 to write data to and read data from the plurality of tape cartridges 226. More specifically, it is noted that the tape library 212 illustrated in FIG. 2 is just one non-exclusive example of a tape library 212 that can be incorporated into the present invention, and no limitations are intended based on the specific type and/or size of the tape library 212 shown in FIG. 2.

In various embodiments, as illustrated in FIG. 2, the tape library 212 can include one or more of: (i) a library housing 232 that defines a library interior 234, (ii) a plurality of storage slots 236 that are each configured to receive and selectively retain (and store) a tape cartridge 226, (iii) a rack assembly 238 including one or more racks 240, (iv) a tape cartridge retrieval assembly 242 (also sometimes referred to herein as a "retrieval assembly", a "tape robot", or simply a "robot"), (v) the tape drive system 230 including the one or more tape drives 228, (vi) a power supply 244, (vii) a library control system 246, (viii) a graphical user interface 248 (illustrated in phantom, and also sometimes referred to herein as a "GUI"), and (ix) a climate controller 250.

In various embodiments, the tape library 212 (such as via the library control system 246) and/or the tape drives 228 (such as via a drive controller 382 (illustrated in FIG. 3)) can be configured to generate error codes when any type of failure occurs during the process of writing data to and/or reading data from the tape cartridges 226 with the tape drives 228. It is appreciated that the specific error code(s) that are generated are designed to provide information regarding the specific type of failure that was experienced during the process of writing data to and/or reading data from the tape cartridges 226 with the tape drives 228. Subsequently, the tape library 212 and/or the tape drives 228 can be further configured to transmit the error code(s) to the error diagnostic system 20 (illustrated in FIG. 1) via the data transmission system 18 (illustrated in FIG. 1).

The library housing 232 is configured to retain various components of the tape library 212. For example, in the embodiment illustrated in FIG. 2, the plurality of storage slots 236, the rack assembly 238 including the rack(s) 240, the retrieval assembly 242, the one or more tape drives 228 of the tape drive system 230, the power supply 244, the library control system 246, and the climate controller 250 can all be received and retained at least substantially, if not entirely, within the library interior 234 that is defined by the library housing 232. As illustrated in FIG. 2, the library housing 232 can be rigid and can have a substantially rectangular-shaped cross-section. Alternatively, the library housing 232 can have another suitable shape or configuration. For example, the library housing 232 can have a substantially square-shaped cross-section or any other suitable shaped cross-section. In many embodiments, the library housing 232 may be constructed of any number of conventional materials such as, for example, those utilized in industry standard rack mount cabinets.

In the embodiment shown in FIG. 2, the plurality of storage slots 236 can be positioned within the library housing 232, with the storage slots 236 being configured to receive and retain (and store) the tape cartridge(s) 226. More particularly, in various embodiments, each of the storage slots 236 is configured to receive and retain a single tape cartridge 226. Alternatively, storage slots 236 can be used that are configured to receive and retain multiple tape cartridges 226 therein. It is noted that no tape cartridges 226 are shown as being retained within the storage slots 236 in FIG. 2 for clarity.

The tape library 212 can include any suitable number of storage slots 236, and/or the tape library 212 can be designed to retain any suitable number of tape cartridges 226. Moreover, the storage slots 236 can be arranged within the tape library 212 in any suitable manner. For example, in certain embodiments, the tape library 212 can include forty storage slots 236 arranged in two four-by-five storage areas. More particularly, in this embodiment, the tape library 212 includes two magazines 252, one on each side of the retrieval assembly 242, with each magazine 252 including four columns of storage slots 236, and with each column having five storage slots 236 oriented substantially horizontally one on top of another (with limited spacing therebetween). Alternatively, the tape library 212 can include greater than forty or fewer than forty storage slots 236 and/or the storage slots 236 can be arranged in a different manner than is illustrated and described in relation to FIG. 2. For example, in certain non-exclusive alternative embodiments, the tape library 212 can be configured to include hundreds or even thousands of storage slots 236, each being configured to receive and retain a separate tape cartridge 226.

The design and configuration of the rack assembly 238 can be varied to suit the specific requirements of the tape library 212. For example, in one non-exclusive embodiment, the rack assembly 238 can include four individual racks 240 that are spaced apart from one another. In some embodiments, each rack 240 can be oriented in a generally vertical direction and can extend a height that is sufficient to enable the retrieval assembly 242 to effectively retrieve a tape cartridge 226 from any of the plurality of storage slots 236. Alternatively, the rack assembly 238 can include a different number of racks 240. For example, in some non-exclusive alternative embodiments, the rack assembly 238 can include two racks 240, three racks 240 or more than four racks 240 that can be spaced apart from one another.

The retrieval assembly 242, or robot, selectively, such as upon request of a user or host application 16 (illustrated in FIG. 1), retrieves and moves the tape cartridge 226 as desired between the storage slots 236 and the tape drives 228. In particular, during use, upon receiving a signal from the library control system 246 to access a certain tape cartridge 226, the retrieval assembly 242 can be manipulated to physically retrieve the requested tape cartridge 226 from its associated storage slot 236 in the tape library 212. Subsequently, the retrieval assembly 242 moves the tape cartridge 226 to an appropriate tape drive 228, and inserts the tape cartridge 226 into a drive housing 258 of the tape drive 228 so that requested read/write operations can be performed. Upon completion of the requested read/write operations, the retrieval assembly 242 can then return the tape cartridge 226 to an appropriate storage slot 236.

It is appreciated that although a single retrieval assembly 242 is illustrated in FIG. 2, the tape library 212 can be designed to include more than one retrieval assembly 242. For example, in one non-exclusive alternative embodiment, the tape library 212 can include two retrieval assemblies 242 that function in different portions of the tape library 212 and/or that provide redundancy in the event that one of the retrieval assemblies 242 fails.

The one or more tape drives 228 can be configured for reading and/or writing data with respect to the tape cartridge 226. The number of tape drives 228 provided within the tape library 212 can be varied to suit the specific requirements of the tape library 212. For example, in certain embodiments, the tape library 212 can include three tape drives 228 that are stacked substantially one on top of another (with limited spacing therebetween). Alternatively, the tape library 212 can include greater than three or fewer than three tape drives 228 and/or the tape drives 228 can be positioned in a different manner relative to one another. For example, in some non-exclusive alternative embodiments, the tape library 212 can be configured to include one hundred or more tape drives 228.

In certain embodiments, the tape library 212 can include more than a single tape drive system 230 for purposes of providing the one or more tape drives 228. For example, in some embodiments, the tape library 212 can include a plurality of tape drive systems 230, with each tape drive system 230 including one or more individual tape drives 228.

The power supply 244 provides electrical power in a well-known manner to the one or more tape drives 228, the retrieval assembly 242, the library control system 246 and/or additional tape libraries 212. The power supply 244 can be interfaced with these components as well as with an external power source in a well-known manner using industry standard cabling and connections. Alternatively, the power supply 244 can be interfaced with these components in another manner.

The library control system 246 (also sometimes referred to as "library software") provides the desired and necessary control for oversight functionality of the tape library 212. The library control system 246 can have any suitable design, many of which are well-known in the industry. For example, in one embodiment, the library control system 246 can include a standard driver interface unit for receiving digital commands and translating the commands into driving currents, such as step pulses for controlling stepper motors, and/or for controlling the climate controller 250. In certain embodiments, the library control system 246 can include a standard programmable general-purpose computer formed on a single plug-in card unit and can include a programmed microprocessor or microcontroller, memory, communication interface, control interface, connectors, etc. Alternatively, the library control system 246 can have a different design and/or the library control system 246 can be positioned within the tape library 212 in a different position or manner than that illustrated in FIG. 2.

Importantly, in various embodiments, the library control system 246 can be further configured for generating error codes due to any failures realized during the process of the tape drives 228 being used to write data to and/or read data from any of the tape cartridges 226. The library control system 246 can be additionally configured for transmitting such error codes to the error diagnostic system 20, such as via the data transmission system 18.

The tape library 212 can use well-known industry standard cabling and communication protocols between the library control system 246 and other structures of the tape library 212. Cabling and electrical characteristics including signaling protocols can be generally standardized, and the logical message protocols can be either proprietary or standardized as known to those skilled in the art.

As shown, the tape library 212 can also include the GUI 248, or other suitable output device, such as an interactive touchscreen graphical user interface or another suitable graphical user interface, which allows the user or host 16 to interact with and/or transmit requests or commands to and/or from the tape library 212. In certain embodiments, the GUI 248, or other suitable output device, can provide information and/or feedback to the host 16 from the error diagnostic system 20 in the form of visual output, audio output and/or tactile output. Additionally, or in the alternative, in some embodiments, information and/or feedback, often in the form of remedial recommendations, can be provided to the host 16 in the form of email.

The climate controller 250 controls the climate, such as the temperature and/or humidity, within the library interior 234. In various embodiments, the climate controller 250 can regulate, adjust, control and/or maintain a specific climate within the library interior 234. In certain embodiments, at various times, the specific climate that is regulated, adjusted, controlled and/or maintained by the climate controller 250 within the library interior 234 can be based on a climate outside of the library interior 16.

Figure 3:
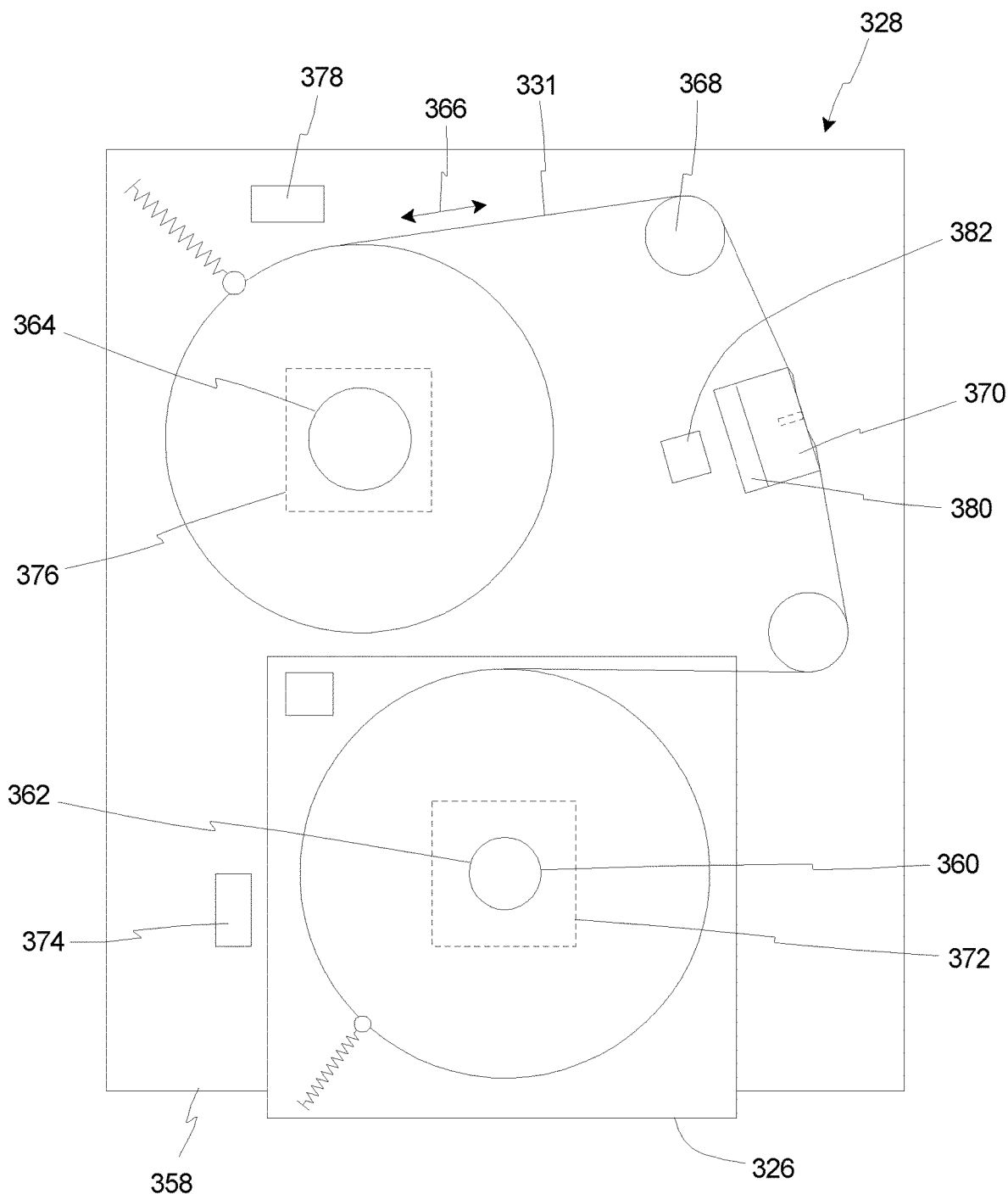
FIG. 3 is a simplified schematic top view illustration of a magnetic tape drive, and a magnetic tape cartridge that has been inserted into the magnetic tape drive, which can be included as part of the tape library illustrated in FIG. 2.

FIG. 3 is a simplified schematic top view illustration of a magnetic tape drive 328, and a magnetic tape cartridge 326 that has been inserted into the tape drive 328, which can be included as part of the tape library 212 illustrated in FIG. 2.

In FIG. 3, covers for the tape drive 328 and the tape cartridge 326 have been omitted for clarity so that the interior of such components is visible. As shown, the tape cartridge 326 is configured to retain a magnetic tape 331. It is appreciated that the tape drive 328 as shown in FIG. 3, in certain aspects, represents a generic tape drive in terms of overall size, shape and design, and is shown by way of example and not by way of limitation. In some embodiments, the tape drive 328 operates in compliance with an LTO specification, such as LTO-8 or LTO-9. Stated in another manner, in such embodiments, the tape cartridge 328 is an LTO-compatible tape cartridge.

During use of the tape drive 328, the tape cartridge 326 is inserted into a drive housing 358 of the tape drive 328 so that the tape drive 328 can read data from and/or write data to the tape cartridge 326. As shown, the tape cartridge 326 includes a cartridge reel 360 that includes and/or defines a cartridge hub 362. The magnetic tape 331 is spooled about the cartridge hub 362 of the cartridge reel 360. In certain embodiments, the magnetic tape 331 can include at least one servo track (not shown) and a plurality of data tracks (not shown) that run along a longitudinal length of the magnetic tape 331. Each of these tracks can be positioned substantially parallel to each other.

The tape cartridge 326 supplies the magnetic tape 331 to the tape drive 328. More particularly, when the tape cartridge 326 is inserted into the drive housing 358 of the tape drive 328, one end of the magnetic tape 331 is taken up within the tape drive 328 to be wrapped around a drive reel 364 included in the tape drive 328. The magnetic tape 331 traverses a predefined path 366 (illustrated as a two-headed arrow) between the cartridge reel 360 and the drive reel 364, which is defined, at least in part, by one or more rollers 368 (two are shown in FIG. 3) positioned at strategic positions along the predefined path 366. The rollers 368 may also aid in limiting gross lateral movement (i.e. in and out of the page as shown in FIG. 3) of the magnetic tape 331, sometimes referred to as lateral tape motion or "LTM".

Along the predefined path 366, the drive reel 364 moves the magnetic tape 331 across a tape head assembly 370 (also sometimes referred to herein as a "head assembly", "tape heads" or simply as a "head") that is configured to read data from and/or write data to the magnetic tape 331. In alternative embodiments, the head assembly 370 can include at least one read head, at least one write head, and at least one read/write head. In particular, the head assembly 370 is positioned in close proximity to the predefined path 366 of the magnetic tape 331 such that as the magnetic tape 331 travels in the longitudinal direction (by being wound from the cartridge reel 360 to the drive reel 364 or vice versa) the head assembly 370 can read/write data to particular tracks and longitudinal positions of the magnetic tape 331. The head assembly 370 and/or a separate head assembly can include one or more servo elements configured to read the servo track(s) of the magnetic tape 331 in order to effectively maintain proper alignment between the head assembly 370 and the magnetic tape 331. It is appreciated that the tape drive 328 can include any suitable number of heads within the head assembly 370 for purposes of reading data from and/or writing data to the magnetic tape 331. For example, in one non-exclusive embodiment, the head assembly 370 can include 32 heads for purposes of reading data from and/or writing data to 32 data tracks on the magnetic tape 331.

In some embodiments, as shown, the tape drive 328 can also include a cartridge reel motor 372 (illustrated as a box in phantom) that generates the necessary force to rotate the cartridge reel 360 at will, and a cartridge reel encoder 374, such as a sensor or detector, that is configured to output signals representing the pulse rate (or rotation rate) of the cartridge reel motor 372.

In certain embodiments, the tape drive 328 can include a drive reel motor 376 (illustrated as a box in phantom) that generates the necessary force to rotate the drive reel 364 at will, and a drive reel encoder 378, such as a sensor or detector, that is configured to output signals representing the pulse rate (or rotation rate) of the drive reel motor 376.

As illustrated in this embodiment, the tape drive 328 also includes an actuator 380 and a drive controller 382 (also sometimes referred to as "drive software"), including one or more processors and circuits, that can be communicatively coupled to the head assembly 370. The actuator 380 is configured to control the lateral position of the head assembly 370 and/or the individual heads of the head assembly 370 relative to the magnetic tape 331 based on a signal provided by the drive controller 382. As such, the actuator 380 comprises a mechanical positioner to move the head assembly 370 up or down laterally. By controlling the lateral position of the head assembly 370 relative to the magnetic tape 331, particular tracks of the magnetic tape 331 can be accessed as desired. Alternatively, the tape drive 328 can include more than one actuator 380. For example, the tape drive 328 can include a separate actuator 380 for each head.

The drive controller 382 is in communication with the actuator 380 and a number of other drive hardware components within the tape drive 328, including the head assembly 370. For example, although not specifically shown in FIG. 3, each of the cartridge reel motor 372, the cartridge reel encoder 374, the drive reel motor 376, and the drive reel encoder 378 can be in communication with the drive controller 382. As such, the drive controller 382 can be configured to perform various specified operations, either individually, or in combination with other software, hardware and/or firmware elements.

Importantly, in various embodiments, the drive controller 382 can be further configured for generating error codes due to any failures realized during the process of the tape drives 328 being used to write data to and/or read data from any of the tape cartridges 326. The drive controller 382 can be additionally configured for transmitting such error codes to the library control system 246 (illustrated in FIG. 2) before such error codes are transmitted by the library control system 246 to the error diagnostic system 20 (illustrated in FIG. 1), such as via the data transmission system 18 (illustrated in FIG. 1). Additionally, or in the alternative, the drive controller 382 can be further configured to transmit the error codes to the error diagnostic system 20, such as via the data transmission system 18, without first being transmitted to the library control system 246.

Returning back to FIG. 1, the tape library system 10 can include any suitable number of hosts 16 that can access and interact with the tape libraries 12 and the data centers 14 in any suitable manner. In particular, it is appreciated that although nine hosts 16 are specifically illustrated in FIG. 1, the tape library system 10 can include fewer than nine hosts 16 (and as low as a single host 16) or greater than nine hosts 16 (and as many as hundreds or thousands of hosts 16).

During use of the tape library system 10, the hosts 16 can typically make various requests for the tape libraries 12 and/or data centers 14 to perform any desired read/write operations using any appropriate tape drives 228 (illustrated in FIG. 2) and tape cartridges 226 (illustrated in FIG. 2) depending upon the specific requests being made by the hosts 16.

It is appreciated that the hosts 16 can effectively access the tape libraries 12 and/or the data centers 14 in any suitable manner, utilizing any suitable type of input device. For example, in certain non-exclusive alternative embodiments, the input device usable by the hosts 16 can include one or more of the GUI 248 (illustrated in FIG. 2) that is built into each of the individual tape libraries 12, an alphanumeric input device such as a keyboard including alphanumeric and other keys, a cursor control device such as a mouse, a trackball, a stylus, or cursor direction keys, and a touch screen.

It is further appreciated that the hosts 16 can receive feedback, data or information from the tape libraries 12, the data centers 14 and/or the error diagnostic system 20 utilizing any suitable type of output device. Stated in another manner, the tape library system 10 can further include any suitable type of output device for purposes of transmitting any feedback, data or information from the tape libraries 12, the data centers 14 and/or the error diagnostic system 20 back to the hosts 16. For example, in some non-exclusive alternative embodiments, the output device can include a display device, such as the GUI 248, that can provide one or more of visual output, auditory output and tactile output. Additionally, or in the alternative, in certain embodiments, information and/or feedback, often in the form of remedial recommendations, can be provided to the host 16 in the form of email.

The tape library system 10 can further include a bus or other suitable communications device for purposes of enabling communications of any desired data and information in either direction between the hosts 16 and the tape libraries 12 and/or the data centers 14.

As noted above, during use of the tape libraries 12 and/or the tape drives 228 for purposes of writing data to and/or reading data from the tape cartridges 226, many different types of failures or errors can occur. When such failures or errors occur, the tape libraries 12 (such as through the library control system 246 (illustrated in FIG. 2)) and/or the tape drives 228 (such as through use of the drive controller 382 (illustrated in FIG. 3)) can be configured to generate error codes that specifically relate to the types of failures or errors that occurred. In many embodiments, the error codes can further include information that identifies the particular data center 14, tape library 12, tape drive 228 and tape cartridge 226 in which the failures or errors occurred. In some embodiments, the error codes can also identify the particular location on the magnetic tape 331 (illustrated in FIG. 3), such as the linear position along a length of the tape 331, the data band, the wrap number, etc., at which the failures or errors occurred.

Once the error codes have been generated by the tape libraries 12 (such as through the library control system 246) and/or the tape drives 228 (such as through the drive controller 382), the error codes can then be transmitted to the error diagnostic system 20 via the data transmission system 18. In various embodiments, the data transmission system 18 can include any suitable type of transmission device or system, such as utilizing the Internet, a bus or other suitable information transmission device or system, for purposes of transmitting the error codes to the error diagnostic system 20.

In some embodiments, the error diagnostic system 20 can be a cloud-based system that enables the collection of error code data and information into a central location from the plurality of tape libraries 12 at the plurality of data centers 14, which can be at different geographical locations. Alternatively, the error diagnostic system 20 can be another suitable type of centrally-based system that enables the collection of error code data and information into a central location from the plurality of tape libraries 12 at the plurality of data centers 14.

The design of the error diagnostic system 20 can be varied to suit the requirements of the tape library system 10. In various embodiments, as shown in FIG. 1, the error diagnostic system 20 can include the central database 22, and the system controller 24, including the processor 24A, which is configured to control operation of the error diagnostic system 20 for purposes of diagnosing tape drive and media issues within the tape library system 10. Alternatively, the error diagnostic system 20 can include more components than those specifically illustrated and described in relation to FIG. 1.

As an overview, the error diagnostic system 20 incorporated within the present invention provides a unique data collection infrastructure, and includes rules that have been created and are utilized to automatically disposition problems as they occur. More particularly, the present invention includes the central database 22, which in one non-exclusive embodiment can be incorporated within a cloud-based approach, that is implemented for gathering library snapshot data, often in the form of error code data that is generated when failures or errors occur during use of the tape drives 228 in any of the tape libraries 12 and/or data centers 14 for purposes of writing data to and/or reading data from the tape cartridges 226. The data collection system thus retrieves the necessary data that is required for subsequent analysis. Rules that have been established and are applied during use of the error diagnostic system 20 include one or more of (i) determining when generated error codes and/or combinations of error codes indicate that immediate tape drive 228 replacement is warranted; (ii) determining when generated error codes and/or combinations of error codes indicate that immediate tape cartridge 226 replacement is warranted; (iii) determining a ratio check approach to determine if write/read issues realized within the tape drives 228 are common enough to warrant tape drive 228 replacement; and (iv) determining rules using positional data on the magnetic tape 331 to identify problems within the tape cartridge 226 where repeated failures happen at the same location. Stated in another manner, the established rules are applied to the error code data, and the corresponding analysis results in a set of communications that are then provided to the customer or host 16 for purposes of then performing the recommended remedial actions.

As such, implementation of the present invention within large-scale tape library systems provides technical benefit in the way the data is collected from the plurality of tape libraries 12 and/or the plurality of data centers 14 in a seamless manner, and results are then made available to the customer in a real-time basis. This provides a much faster response to the customers than the customary systems where qualified engineers are utilized to look at the data after the fact, thus resulting in quicker replacement of faulty hardware and a much better overall experience.

The central database 22 can have any suitable design for purposes of effectively collecting and retaining error code data that is generated from failures and/or errors that occur during use of the tape drives 228 in any of the tape libraries 12 and/or data centers 14 when writing data to and/or reading data from the tape cartridges 226. For example, in various embodiments, the central database 22 can include one or more storage devices that are configured to collect and retain any such error code data that is generated from failures and/or errors that occur during use of the tape drives 228 in any of the tape libraries 12 and/or data centers 14 when writing data to and/or reading data from the tape cartridges 226. In the non-exclusive embodiment illustrated in FIG. 1, the central database 22 includes a first storage device 22A, a second storage device 22B, and a third storage device 22C. Alternatively, in other embodiments, the central database 22 can include fewer than three storage devices (such as simply a single storage device) or greater than three storage devices.

In certain embodiments, the first storage device 22A can be a volatile storage device, such as random-access memory (RAM) or other suitable volatile storage device, that can be utilized for primary storage of any and all error code data, or other data collections that may change over time. In some embodiments, the first storage device 22A can further be utilized for storing information and instructions to be executed by the processor 24A of the system controller 24, which may be modified over time as new error code data is received and analyzed, and as additional feedback is received regarding the effectiveness of any recommended remedial actions. For example, if certain error codes were previously analyzed in a manner that led to a certain remedial recommendation being forward to the customer, the effectiveness, or lack thereof, of such remedial recommendation can then also be recorded within the first storage device 22A for strengthening or weakening the probability of such remedial recommendations being made in the future when similar error codes are subsequently analyzed. In one embodiment, the first storage device 22A can further be used for storing temporary variables or other intermediate information usable during execution of instructions by the processor 24A of the system controller 24.

In some embodiments, the second storage device 22B can be a non-volatile storage device, such as read-only memory (ROM) and/or any other suitable static storage device, that can be utilized for storing any static information and instructions usable during execution of instructions by the processor 24A of the system controller 24.

In certain embodiments, the third storage device 22C can be a back-up data storage device, such as a magnetic disk or optical disk and its corresponding disk drive, flash memory, or other suitable type of data storage device, that can be utilized for purposes of storing back-up data, such as when no power is supplied to the error diagnostic system 20.

It is appreciated that any of the noted functions of any and all of the storage devices 22A-22C within the central database 22 can be performed within the central database 22 in any suitable manner using any individual storage device or any combination of storage devices.

The system controller 24, including the processor 24A, is configured to analyze the error codes that are stored within the central database 22 to determine a health of the tape drives 228 and/or the tape cartridges 226 to which the error codes specifically relate. More specifically, in various embodiments, the system controller 24 and/or the processor 24A are configured to analyze one or more of the error codes that are stored within the central database 22 to determine one of (i) the tape drive 228 from which the error code(s) derived, which is positioned within a particular tape library 12, needs to be replaced, (ii) the tape cartridge 226 from which the error code(s) derived, which has been utilized within one or more tape drives 228 that are positioned within the particular tape library 12, needs to be replaced, and (iii) the particular tape library 12 can continue operation without replacement of the tape drive 228 and/or the tape cartridge 226 within the particular tape library 12.

During use of the error diagnostic system 20, the system controller 24 and/or the processor 24A are configured to follow a plurality of methodological steps in order to effectively and accurately determine the health of the tape drives 228 and/or the tape cartridges 226 to which the error codes being analyzed specifically relate.

In certain embodiments, an error code spreadsheet can be generated which provides a list of various categories through which one or more error codes can be grouped together to help accurately determine the correct remedial action to be taken to combat the problems that have been found through use of the tape drives 228 and/or the tape cartridges 226 within any of the tape libraries 12 and/or data centers 14. In some embodiments, columns formed into the error code spreadsheet can include one or more of (1) drive type; (2) half-height drive vs. full-height drive; (3) primary error code returned by the tape drive; (4) secondary error code returned by the tape drive, which can provide additional information that can sometimes help provide a more detailed understanding of the primary error code; (5) main tape alert combination returned by the tape drive for a given error code; (6) error count of a particular type versus total load count; (7) basic description of the definition or meaning of the error code, and any additional notes related to the particular failure event; (8) grouping of generalized error types; (9) indication of whether the particular error code may be a potential debris issue; (10) indication as set within the drive that the failure is indicative of a problem with the tape cartridge; (11) indication that the error codes may be resolved through initiation of certain recovery steps to bring the tape drive back online and into use; (12) latest firmware version where there has ben a fix for the realized error code; (13) recommended action to take, including replacement of the tape drive or the tape cartridge, once a threshold error count has been reached; and (14) indication of how common a particular error code may be.

In various embodiments, a particular sequence of methodological steps are undertaken by the system controller 24 and/or the processor 24A when determining the health of the tape drives 228 and/or the tape cartridges 226 to which the error codes being analyzed specifically relate. For example, in one non-exclusive embodiment, the sequence of methodological steps can include:

(1) Missing End-of-Data (EOD) Check—which can be indicative of when a tape drive has a hard write error;

(2) Error Handling—to handle simple cases that are easily dispositioned using either Tape Alert or Error Codes that indicate error types of "Application", "Cleaning" or "Ecosystem" issues;

(3) Error Handling—to work through stuck/stranded tape issues, including first write/read investigation steps;

(4) Error Handling—including final checks for non-drive issues as well as a final ratio check to evaluate drive failure rate;

(5) Check for Tape Alert with Invalid Error Code;

(6) Firmware Check—to see if there is a drive firmware fix for the error code reported;

(7) Drive Problem Ratio Check—this takes inputs from the error code spreadsheet which includes error code specific failure rate data;

(8) Likely Debris Issues—often the case when large quantities of brand new storage media is in use;

(9) Evaluate Data Band, Wrap and LPOS—storage media that has a particular bad spot, either because of edge damage or other issues, can be identified by checking the location of failures.

It is appreciated, however, that in other embodiments, the order of the steps can be modified, certain steps can be skipped, and/or additional steps can be added during the process of utilizing the system controller 24 and/or the processor 24A to determine the health of the tape drives 228 and/or the tape cartridges 226 to which the error codes being analyzed specifically relate.

Once an appropriate response and/or recommended remedial action has been determined by the system controller 24 and/or the processor 24A based on analysis of relevant error code(s), the system controller 24 and/or the processor 24A can be further configured to transmit the response and/or recommended remedial action directly or indirectly to the host 16. For example, for purposes of a potential direct transmission to the host 16, in one non-exclusive embodiment, the system controller 24 and/or the processor 24A can generate an email that is sent to the host 16 that includes the response and/or recommended remedial action relating to the initial request by the host 16 to have certain read/write operations performed within the tape libraries 12 and/or data centers 14. Alternatively, for purposes of a potential indirect transmission to the host 16, in certain embodiments, the system controller 24 and/or the processor 24A can transmit the response and/or recommended remedial action back to the corresponding tape library 12 or data center 14 such as via the data transmission system 18. Subsequently, the response and/or recommended remedial action can be made available to the host 16 through use of any suitable output device, such as described in greater detail herein above. Still alternatively, transmission of the response and/or recommended remedial action can occur directly or indirectly in another suitable manner.

Once the response and/or recommended remedial action has thus been transmitted to the host 16, the host 16 can then pursue appropriate further action based on the response and/or recommended remedial action. Depending on the actual response and/or recommended remedial action, the appropriate further action can include one or more of replacing the tape drive, replacing the tape cartridge, or continuing use of the tape library system as is.

Figure 4:
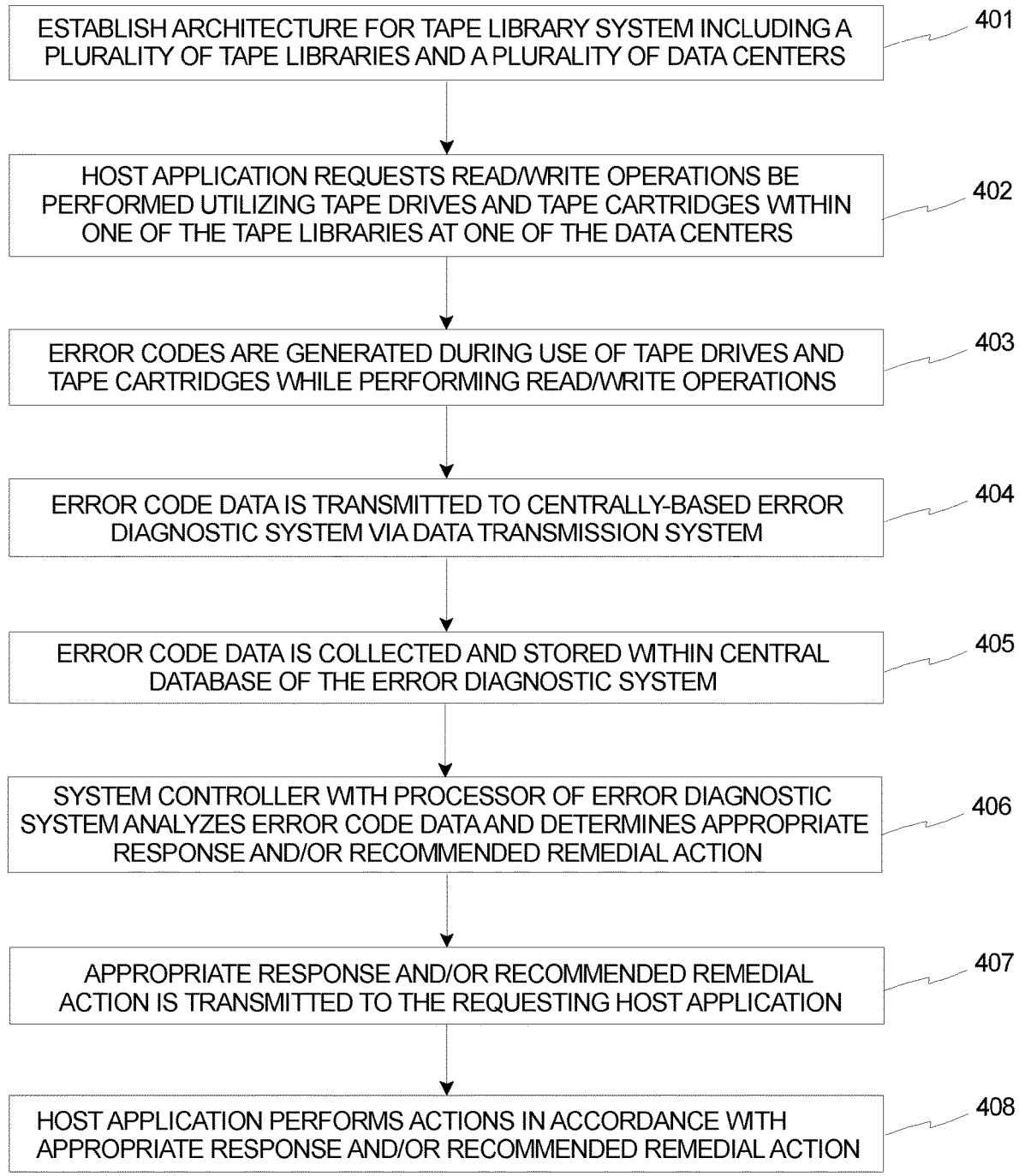
FIG. 4 is a simplified flowchart illustrating an embodiment of implementation of the present invention within a large-scale tape library system.

FIG. 4 is a simplified flowchart illustrating an embodiment of implementation of the present invention within a large-scale tape library system.

At step 401, architecture is established for the tape library system including a plurality of tape libraries and a plurality of data centers. Each of the plurality of data centers includes at least one of the plurality of tape libraries. In certain embodiments, at least two of the plurality of data centers are positioned at different geographical locations. In other embodiments, each of the plurality of data centers is positioned at different geographical locations.

At step 402, upon request of a host application, one or more read/write operations are performed utilizing at least one tape drive and at least one tape cartridge within one of the tape libraries at one of the data centers.

At step 403, error codes are generated within the tape drive and/or tape library based on any failures or errors that may have occurred during the process of performing the requested read/write operations. In various embodiments, the error codes can include information relating to one or more of (i) the type of failure or error that has occurred, (ii) in which data center the noted failure or error has occurred, (iii) in which tape library the noted failure or error has occurred, (iv) which tape drive was being used when the noted failure or error occurred, (v) which tape cartridge was being used when the noted failure or error occurred, and (vi) the specific location within the tape cartridge, such as LPOS, data band, wrap number, etc., at which the noted failure or error occurred.

At step 404, error code data from the generated error codes is transmitted to a centrally-based error diagnostic system via a data transmission system. It is appreciated that the error diagnostic system can be configured to receive such error code data from each of the plurality of tape libraries and each of the data centers that are incorporated within the large-scale tape library system.

At step 405, the received error code data is stored within a central database that is included within the error diagnostic system.

At step 406, a system controller including a processor of the error diagnostic system analyzes the received error code data and determines an appropriate response and/or recommended remedial action based at least in part on the error code data. In many embodiments, the error code data is analyzed in light of any and all previously received error code data that can provide valuable information with respect to how and why such failures or errors within the tape drive, the tape cartridge and/or the tape library may have occurred. As provided herein, in various embodiments, the appropriate response and/or recommended remedial action can include one or more of recommended replacement of the corresponding tape drive, recommended replacement of the corresponding tape cartridge, recommended cleaning of the corresponding tape drive, and recommended continued use of the corresponding tape drive and tape cartridge essentially as is.

At step 407, the appropriate response and/or recommended remedial action is transmitted, either directly or indirectly, to the host application that made the initial request for performing of the desired read/write operations. In one embodiment, direct transmission of the appropriate response and/or recommended remedial action can occur through generation of a suitable email by the system controller and/or the processor of the error diagnostic system. In another embodiment, indirect transmission of the appropriate response and/or recommended remedial action can occur by initially transmitting such information back to the corresponding data center and tape library via the data transmission system, before such information is then transmitted by to the host application via a suitable output device.

At step 408, the host application can perform actions in accordance with the appropriate response and/or recommended remedial action.

As described herein, the concept behind the error diagnostic system is to isolate issues in the appropriate order to make sure that a tape drive is identified for replacement in the minimum number of cases possible. In particular, there are some issues that immediately flag a tape drive for replacement, but apart from those, issues are identified as recoverable media issues, definite media issues, and then a tape drive is only flagged for replacement if it fails often enough. For example, in various embodiments, the decision-making process as performed by the system controller and/or the processor of the error diagnostic system can proceed generally as follows:

1. Recoverable media problems (mostly missing EOD related) are flagged;
2. Specific application/ecosystem issues, with periodic cleaning issues being ignored;
3. Specific issues are almost always debris related—these are flagged with specific error codes, or the fact that the tape in use has 1 or 2 tape loads;
4. Firmware issues are flagged, and code update recommendations made;
5. Specific error codes indicate a drive hardware issue;
6. Other error codes indicate a definite media problem;
7. Stuck tape issues are flagged and may be manually recovered;
8. Specific load errors are drive or media and are isolated by use of a tape in multiple drives or a drive with multiple tapes;
9. A history of problems is captured with positional information so media that repeatedly fails at the same location can be identified and not shown as a drive issue; and
10. Once the issues flagged in steps 1-9 have been isolated, any drive that shows an issue will only be called bad if it fails in a threshold number of loads/unloads, such as 5 out of 20 load/unloads in one non-exclusive example.

Thus, in general, the error diagnostic system illustrated and described in detail herein uses multiple approaches to spot certain root causes with a very high degree of confidence leading to the three possible dispositions: drive replacement, media replacements, or continued use as is. Cleaning is managed by the library and assumed as a normal recovery method. Accordingly, the error diagnostic system makes use of error codes and focuses on the following general concepts (i) missing EOD detection; (ii) Identifying issues that are definite debris problems; (iii) Flagging cases where drive FW should be updated; (iv) Flagging error codes that are unresolved drive FW issues so they should not count as drive hardware issues; (v) Suggestions to potentially recover some stuck tape issues; (vi) Flag definite drive issues; and (vii) Flag definite media issues (e.g., broken tapes)

It is understood that although a number of different embodiments of the tape library system have been illustrated and described herein, one or more features of any one embodiment can be combined with one or more features of one or more of the other embodiments, provided that such combination satisfies the intent of the present invention.

While a number of exemplary aspects and embodiments of the tape library system have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A tape library system comprising:
a plurality of tape libraries, each of the plurality of tape libraries including (i) a tape drive, (ii) at least one tape cartridge that retains magnetic tape, and (iii) a tape cartridge mover that moves the tape cartridge relative to the tape drive;
a plurality of data centers, each of the plurality of data centers being configured to retain at least one of the plurality of tape libraries; and
an error diagnostic system including a processor configured to:
receive, from a host application, one or more error codes from the plurality of tape libraries, each of the one or more error codes being generated due to errors that occurred during operation of the tape drive within a corresponding tape library,
analyze the one or more error codes from each of the plurality of tape libraries to determine a response and/or remedial action to mitigate the errors that occurred during operation of the tape drive,
transmit the response and/or remedial action to the host application, and
adjust a probability of the response and/or remedial action being generated in the future responsive to the one or more error codes based on a measure of effectiveness of the response and/or remedial action in mitigating the errors that occurred during operation of the tape drive.

2. The tape library system of claim 1, wherein the processor is configured to analyze the one or more error codes from the plurality of tape libraries to determine one of (i) the tape drive within the corresponding tape library needs to be replaced, (ii) a tape cartridge of the at least one tape cartridge within the corresponding tape library needs to be replaced, and (iii) the corresponding tape library can continue operation without replacement of the tape drive and without replacement of any of the at least one tape cartridge within the corresponding tape library.

3. The tape library system of claim 1, wherein the processor is configured to analyze the one or more error codes from the plurality of tape libraries to determine if the tape drive needs to be cleaned within the corresponding tape library.

4. The tape library system of claim 1, wherein the host application requests that a read/write operation be performed in one of the tape libraries with respect to the at least one tape cartridge utilizing the tape drive of the corresponding tape library; and wherein one of the tape drive and the corresponding tape library generates the one or more error codes based on an error that occurs during the requested read/write operation, and transmits the one or more error codes to the error diagnostic system.

5. The tape library system of claim 1, wherein at least two of the plurality of data centers are positioned in different geographical locations.

6. The tape library system of claim 1, wherein each of the plurality of data centers is positioned in a different geographical location.

7. The tape library of claim 1, wherein the processor is configured to analyze the one or more error codes from each of the plurality of tape libraries by comparing the one or more error codes from each of the plurality of tape libraries with error codes previously captured within the error diagnostic system to determine the response and/or remedial action.

8. The tape library system of claim 1, wherein the processor is configured to adjust the probability of the response and/or remedial action being generated in the future by increasing the probability when the measure of effectiveness indicates the response and/or remedial action was effective and decreasing the probability when the measure of effectiveness indicates the response and/or remedial action was not effective.

9. The tape library system of claim 8, wherein the processor is further configured to receive feedback indicative of the measure of effectiveness.

10. The tape library system of claim 8, wherein the processor is further configured to store the measure of effectiveness associated with the one or more error codes.

11. A method of diagnosing health of components within a tape library system, the system comprising: (i) a plurality of tape libraries, each of the plurality of tape libraries including (a) a tape drive, (b) at least one tape cartridge that retains magnetic tape, and (c) a tape cartridge mover that moves the tape cartridge relative to the tape drive; and (ii) a plurality of data centers, each of the plurality of data centers being configured to retain at least one of the plurality of tape libraries, the method comprising:
receiving, from a host application and by an error diagnostic system, one or more error codes from the plurality of tape libraries, each of the one or more error codes being generated due to errors that occurred during operation of the tape drive within a corresponding tape library;
analyzing, using the error diagnostic system, the one or more error codes to determine a response and/or remedial action to mitigate the errors that occurred during operation of the tape drive;
transmitting the response and/or remedial action to the host application; and
adjusting a probability of the response and/or remedial action being generated in the future responsive to the one or more error codes based on a measure of effectiveness of the response and/or remedial action in mitigating the errors that occurred during operation of the tape drive.

12. The method of claim 11, wherein analyzing the one or more error codes comprises determining one of (i) the tape drive within the corresponding tape library needs to be replaced, (ii) a tape cartridge of the at least one tape cartridge within the corresponding tape library needs to be replaced, and (iii) the corresponding tape library can continue operation without replacement of the tape drive and without replacement of any of the at least one tape cartridge within the corresponding tape library.

13. The method of claim 11, wherein analyzing the one or more error codes comprises determining if the tape drive needs to be cleaned within the corresponding tape library.

14. The method of claim 11, further comprising requesting with the host application that a read/write operation be performed in one of the tape libraries with respect to the at least one tape cartridge utilizing the tape drive of the corresponding tape library; generating the one or more error codes with one of the tape drive and the corresponding tape library based on an error that occurs during the requested read/write operation; and transmitting the one or more error codes to the error diagnostic system.

15. The method of claim 11, wherein analyzing the one or more error codes comprises comparing the one or more error codes from each of the plurality of tape libraries with error codes previously captured within the error diagnostic system to determine the health of the tape drive and the at least one tape cartridge within the corresponding tape library.

16. The method of claim 11, wherein adjusting the probability of the response and/or remedial action being generated in the future comprises increasing the probability when the measure of effectiveness indicates the response and/or remedial action was effective and decreasing the probability when the measure of effectiveness indicates the response and/or remedial action was not effective.

17. The method of claim 11, further comprising storing, by the error diagnostic system, the measure of effectiveness associated with the one or more error codes based on received feedback, the received feedback indicative of whether the response and/or remedial action was effective in mitigating the errors that occurred during operation of the tape drive.

18. The method of claim 17, wherein analyzing the one or more error codes comprises determining whether the one or more error codes were previously analyzed and analyzing the measure of effectiveness of previously determined responses and/or remedial actions.

19. A tape library system, comprising:
a plurality of tape libraries, each of the plurality of tape libraries including (i) a tape drive, (ii) at least one tape cartridge that retains magnetic tape, and (iii) a tape cartridge mover that moves the tape cartridge relative to the tape drive;
a plurality of data centers, each of the plurality of data centers being configured to retain at least one of the plurality of tape libraries, at least two of the plurality of data centers being positioned in different geographical locations; and
an error diagnostic system including a processor, the error diagnostic system being in communication with a host application;
wherein the host application is configured to request that a read/write operation be performed in one of the tape libraries with respect to the at least one tape cartridge utilizing the tape drive of the corresponding tape library, wherein one of the tape drive and the corresponding tape library generates one or more error codes based on errors that occur during the requested read/write operation within the corresponding tape library, and transmits the one or more error codes to the error diagnostic system, wherein the processor is configured to:
receive the one or more error codes from each of the plurality of tape libraries,
analyze the one or more error codes determine a recommended response and/or remedial action based on analyzing the one or more error codes, the recommended response and/or remedial action including one of (i) the tape drive within the corresponding tape library needs to be replaced, (ii) a tape cartridge of the at least one tape cartridge within the corresponding tape library needs to be replaced, and (iii) the corresponding tape library can continue operation without replacement of the tape drive and without replacement of any of the at least one tape cartridge within the corresponding tape library,
transmit the recommended response and/or remedial action to the host application, and
adjust a probability of the recommended response and/or remedial action being generated in the future responsive to the one or more error codes based on a measure of effectiveness of the recommended response and/or remedial action in mitigating the errors that occurred during the requested read/write operation.

20. The tape library system of claim 19, wherein each of the plurality of data centers is positioned in a different geographical location.

\* \* \* \* \*